US012585725B2

(12) United States Patent
Shivam et al.

(10) Patent No.: US 12,585,725 B2
(45) Date of Patent: Mar. 24, 2026

(54) NON-RECTANGULAR MATRIX COMPUTATIONS AND DATA PATTERN PROCESSING USING TENSOR CORES

(71) Applicant: NVIDIA Corporation, Santa Clara, CA (US)

(72) Inventors: Aniket Shivam, Santa Clara, CA (US); Andrew Kerr, Santa Clara, CA (US); Haicheng Wu, Santa Clara, CA (US); Manish Gupta, Santa Clara, CA (US); Nikita Shustrov, Santa Clara, CA (US); Qing Yang, Santa Clara, CA (US); Alan Kaatz, Santa Clara, CA (US); Aditya Avinash Atluri, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 1024 days.

(21) Appl. No.: 17/700,239

(22) Filed: Mar. 21, 2022

(65) Prior Publication Data

US 2023/0297643 A1    Sep. 21, 2023

(51) Int. Cl.
  *G06F 17/16*         (2006.01)
  *G06F 7/483*         (2006.01)
(52) U.S. Cl.
  CPC .............. *G06F 17/16* (2013.01); *G06F 7/483* (2013.01)

(58) Field of Classification Search
  CPC ................................. G06F 17/16; G06F 7/483
  See application file for complete search history.

(56) References Cited

U.S. PATENT DOCUMENTS

| | | | | |
|---|---|---|---|---|
| 2020/0160226 | A1* | 5/2020 | Ross | G06N 3/063 |
| 2020/0342632 | A1* | 10/2020 | Frumkin | G06F 7/544 |
| 2021/0048991 | A1* | 2/2021 | Tanner | G06F 8/4442 |

* cited by examiner

*Primary Examiner* — Michael D. Yaary
(74) *Attorney, Agent, or Firm* — Leydig, Voit & Mayer, Ltd.

(57)     ABSTRACT

Matrix multiplication operations can be implemented, at least in part, on one or more tensor cores of a parallel processing unit. An efficiency of the matrix multiplication operations can be improved in cases where one of the input operands or the output operand of the matrix multiplication operation is a square matrix having a triangular data pattern. In such cases, the number of computations performed by the tensor cores of the parallel processing unit can be reduced by dropping computations and/or masking out elements of the square matrix input operand on one side of the main diagonal of the square matrix. In other cases where the output operand exhibits the triangular data pattern, computations can be dropped or masked out for the invalid side of the main diagonal of the square matrix. In an embodiment, a library implementing the matrix multiplication operations is provided.

20 Claims, 11 Drawing Sheets

Memory 206

Application
210

BLAS
Library
220

Runtime
API
230

Driver
240

CPU
202

PPU
204

Kernel
250

Memory 208

NON-RECTANGULAR MATRIX COMPUTATIONS AND DATA PATTERN PROCESSING USING TENSOR CORES

BACKGROUND

Parallel computing has evolved from specialized graphics processing units to general multi-threaded (e.g., single instruction/multiple thread, SIMT) processors with hundreds or thousands of compute cores. However, these compute cores generally have a limited instruction set that may include integer and floating point operations performed on cores including floating-point arithmetic logic units (ALUs) or integer ALUs. In other words, each thread typically executes a number of instructions in a serial fashion, with each operation consisting of a single multiply and accumulate operation, addition operation, or the like using one of the ALUs. Thus, large operations such as computing a dot product for large vectors may take many clock cycles to compute in a single thread using, e.g., a floating-point arithmetic logic unit.

Many algorithms require complex matrix multiplication operations to be performed. For example, high performance computing (HPC) is used to implement complex chemistry and/or physics simulations, climate modelling, etc. Deep learning (DL) is also used to implement various artificial intelligence algorithms. These matrix multiplication operations involve calculations of large numbers of dot products by multiplying elements of a row of one matrix with elements of a column of another matrix and summing the partial products. Newer processors have attempted to add specialized hardware units that are optimized for performing these types of calculations. A vector unit or vector core can be used to calculate a number of partial products in parallel and then accumulate the partial products to generate a result. More recently, tensor cores extend the idea of a vector unit to matrices enabling a number of dot products to be calculated in parallel. These units dramatically speed up these types of matrix calculations compared to implementing the operations on a conventional floating-point arithmetic logic unit.

These specialized tensor cores require new software frameworks to be created to optimize the efficiency of certain types of calculations. For example, performing basic linear algebra calculations defines input and output matrices of arbitrary size. However, a tensor core may be implemented to process inputs at a fixed size (e.g., a tensor of size 8×8×4 elements) and produce outputs at a fixed size. The software framework is designed to split the arbitrary problem defined in software into a number of sub-problems that can be processed in the hardware using the tensor cores to produce intermediate results that are then aggregated in memory. Conventional functions designed for basic linear algebra calculations may launch multiple kernels, with some being processed on the tensor cores and others being processed on more conventional floating-point arithmetic logic units within the parallel processor. However, this can slow down the operation as managing memory allocation and execution of different kernels on different hardware units in the parallel processor is not efficient. Furthermore, there are subsets of problems that may lend themselves to other types of optimizations where conventional solutions simply are not executed as fast as desirable. Thus, there is a need for addressing these issues and/or other issues associated with the prior art.

SUMMARY

A method, computer readable medium, and system are disclosed for performing matrix multiplication operations.

Matrix multiplication operations can be implemented, at least in part, on one or more tensor cores of a parallel processing unit. An efficiency of the matrix multiplication operations can be improved in cases where one of the input operands or the output operand of the matrix multiplication operation is a square matrix having a triangular data pattern. In such cases, the number of computations performed by the tensor cores of the parallel processing unit can be reduced by dropping computations and/or masking out elements of the square matrix input operand on one side of the main diagonal of the square matrix.

In accordance with a first aspect of the disclosure, a system is provided that includes a host processor, a parallel processing unit including at least one tensor core, and a memory. The memory stores instructions that, when executed by the host processor, cause the host processor to perform a matrix multiplication operation. The matrix multiplication operation is performed by: partitioning an output operand of the matrix multiplication operation into a number of tiles; and determining whether at least one of an input operand or an output operand of the matrix multiplication operation is a square matrix having a triangular data pattern. Responsive to determining that the output operand of the matrix multiplication operation is a square matrix having a triangular data pattern, for at least one tile of the output operand the host processor is configured to: determine whether the at least one tile is valid based on a location of the at least one tile relative to a main diagonal of the square matrix, and responsive to determining that the at least one tile is valid, launch an operation on the parallel processing unit to generate values for the elements of the at least one tile using the at least one tensor core, or responsive to determining that the at least one tile is invalid, prevent the elements of the at least one tile from being processed by the parallel processing unit. Alternatively, responsive to determining that an input operand of the matrix multiplication operation is a square matrix having a triangular data pattern, for at least one tile of the output operand the host processor is configured to: partition a portion of the input operand into a number of sub-tiles associated with the at least one tile of the output operand, for at least one sub-tile of the input operand, determine whether the at least one sub-tile is valid based on a location of the at least one sub-tile relative to a main diagonal of the square matrix, and responsive to determining that the at least one sub-tile is valid, launch an operation on the parallel processing unit to generate values for the elements of the at least one tile using the at least one tensor core to process the elements of the at least one sub-tile, or responsive to determining that the at least one sub-tile is invalid, prevent the elements of the at least one sub-tile from being processed by the parallel processing unit.

In accordance with an embodiment of the first aspect, the parallel processing unit includes a plurality of tensor cores. The operation on the parallel processing unit is configured to: generate elements for a first tile of the output operand via a first tensor core, and generate elements for a second tile of the output operand via a second tensor core. The first tensor core and the second tensor core operate in parallel.

In accordance with an embodiment of the first aspect, responsive to determining that the output operand of the matrix multiplication operation is the square matrix having the triangular data pattern, for at least one tile of the output operand, the host processor is further configured to: determine whether the at least one tile intersects the main diagonal of the square matrix; and responsive to determining that the at least one tile intersects the main diagonal of the square matrix, mask out at least a portion of the elements of the at least one tile on one side of the main diagonal.

In accordance with an embodiment of the first aspect, responsive to determining that the input operand of the matrix multiplication operation is the square matrix having the triangular data pattern, for at least one tile of the output operand, the host processor is further configured to: determine whether at least one sub-tile of the input operand intersects the main diagonal of the square matrix; and responsive to determining that the at least one sub-tile intersects the main diagonal of the square matrix, mask out at least a portion of the elements of the at least one sub-tile on one side of the main diagonal.

In accordance with an embodiment of the first aspect, the square matrix is a triangular matrix.

In accordance with an embodiment of the first aspect, the square matrix is a symmetric matrix. In an embodiment, the matrix multiplication operation comprises multiplying a rectangular matrix of dimension N×K with a transpose of the rectangular matrix.

In accordance with an embodiment of the first aspect, the square matrix is a Hermitian matrix. In an embodiment, the matrix multiplication operation comprises multiplying a rectangular matrix of dimension N×K with a conjugate transpose of the rectangular matrix.

In accordance with an embodiment of the first aspect, the memory stores a library that implements an application programming interface (API) that, responsive to being called by an application, implements at least a portion of the matrix multiplication operation using the parallel processing unit. In an embodiment, the memory further stores a driver configured to launch a kernel on the parallel processing unit.

In accordance with an embodiment of the first aspect, elements of the output operand of the matrix multiplication operation are processed by a single kernel configured to perform the matrix multiplication operation using the at least one tensor core. None of the elements are generated by a floating-point arithmetic logic unit of the parallel processing unit.

In accordance with a second aspect of the disclosure, a computer-implemented method is provided for performing a matrix multiplication operation. The method comprises: partitioning, by a host processor, an output operand of the matrix multiplication operation into a number of tiles, and determining whether at least one of an input operand or an output operand of the matrix multiplication operation is a square matrix having a triangular data pattern. Responsive to determining that the output operand of the matrix multiplication operation is a square matrix having a triangular data pattern, for at least one tile of the output operand the method further comprises: determining whether the at least one tile is valid based on a location of the at least one tile relative to a main diagonal of the square matrix, and responsive to determining that the at least one tile is valid, launching an operation on the parallel processing unit to generate values for the elements of the at least one tile using the at least one tensor core, or responsive to determining that the at least one tile is invalid, preventing the elements of the at least one tile from being processed by the parallel processing unit. Alternatively, responsive to determining that an input operand of the matrix multiplication operation is a square matrix having a triangular data pattern, for at least one tile of the output operand the method further comprises: partitioning a portion of the input operand into a number of sub-tiles associated with the tile of the output operand, for at least one sub-tile of the input operand, determining whether the at least one sub-tile is valid based on a location of the at least one sub-tile relative to a main diagonal of the square matrix, and responsive to determining that the at least one sub-tile is valid, launching an operation on the parallel processing unit to generate values for the elements of the at least one tile using the at least one tensor core to process the elements of the at least one sub-tile, or responsive to determining that the at least one sub-tile is invalid, preventing the elements of the at least one sub-tile from being processed by the parallel processing unit.

In accordance with an embodiment of the second aspect, elements of a first tile of the number of tiles are generated by a first tensor core in parallel with elements of a second tile of the number of tiles generated by a second tensor core.

In accordance with an embodiment of the second aspect, responsive to determining that the output operand of the matrix multiplication operation is the square matrix having the triangular data pattern, for at least one tile of the output operand, the method further comprises: determining whether the at least one tile intersects the main diagonal of the square matrix; and responsive to determining that the at least one tile intersects the main diagonal of the square matrix, masking out at least a portion of the elements of the at least one tile on one side of the main diagonal.

In accordance with an embodiment of the second aspect, responsive to determining that the input operand of the matrix multiplication operation is the square matrix having the triangular data pattern, for at least one tile of the output operand, the method further comprises: determining whether at least one sub-tile of the input operand intersects the main diagonal of the square matrix; and responsive to determining that the at least one sub-tile intersects the main diagonal of the square matrix, masking out at least a portion of the elements of the at least one sub-tile on one side of the main diagonal.

In accordance with an embodiment of the second aspect, the square matrix is a triangular matrix, a symmetric matrix, or a Hermitian matrix.

In accordance with an embodiment of the second aspect, an application executed by the host processor is configured to call an application programming interface of a library configured to implement the matrix multiplication operation. A driver is configured to launch a kernel on the parallel processing unit in response to a call from one of the library or a runtime API.

In accordance with an embodiment of the second aspect, elements of the output operand of the matrix multiplication operation are processed by a single kernel configured to perform the multiplication operation using the at least one tensor core. None of the elements are generated by a floating-point arithmetic logic unit of the parallel processing unit.

In accordance with a third aspect of the disclosure, a non-transitory computer-readable media storing computer instructions for performing a matrix multiplication operation is provided. The instructions, when executed by a host processor, cause the host processor to perform the steps of: partitioning, by a host processor, an output operand of the matrix multiplication operation into a number of tiles, and determining whether at least one of an input operand or an output operand of the matrix multiplication operation is a square matrix having a triangular data pattern. Responsive to determining that the output operand of the matrix multiplication operation is a square matrix having a triangular data pattern, for at least one tile of the output operand the method further comprises: determining whether the at least one tile is valid based on a location of the at least one tile relative to a main diagonal of the square matrix, and responsive to determining that the at least one tile is valid, launching an operation on the parallel processing unit to generate values for the elements of the at least one tile using the at least one tensor core, or responsive to determining that the at least one tile is invalid, preventing the elements of the at least one tile from being processed by the parallel processing unit. Alternatively, responsive to determining that an input operand of the matrix multiplication operation is a square matrix having a triangular data pattern, for at least one tile of the output operand the method further comprises: partitioning a portion of the input operand into a number of sub-tiles associated with the at least one tile of the output operand, for at least one sub-tile of the input operand, determining whether the at least one sub-tile is valid based on a location of the at least one sub-tile relative to a main diagonal of the square matrix, and responsive to determining that the at least one sub-tile is valid, launching an operation on the parallel processing unit to generate values for the elements of the at least one tile using the at least one tensor core to process the elements of the at least one sub-tile, or responsive to determining that the at least one sub-tile is invalid, preventing the elements of the at least one sub-tile from being processed by the parallel processing unit.

DETAILED DESCRIPTION

Figure 1A:
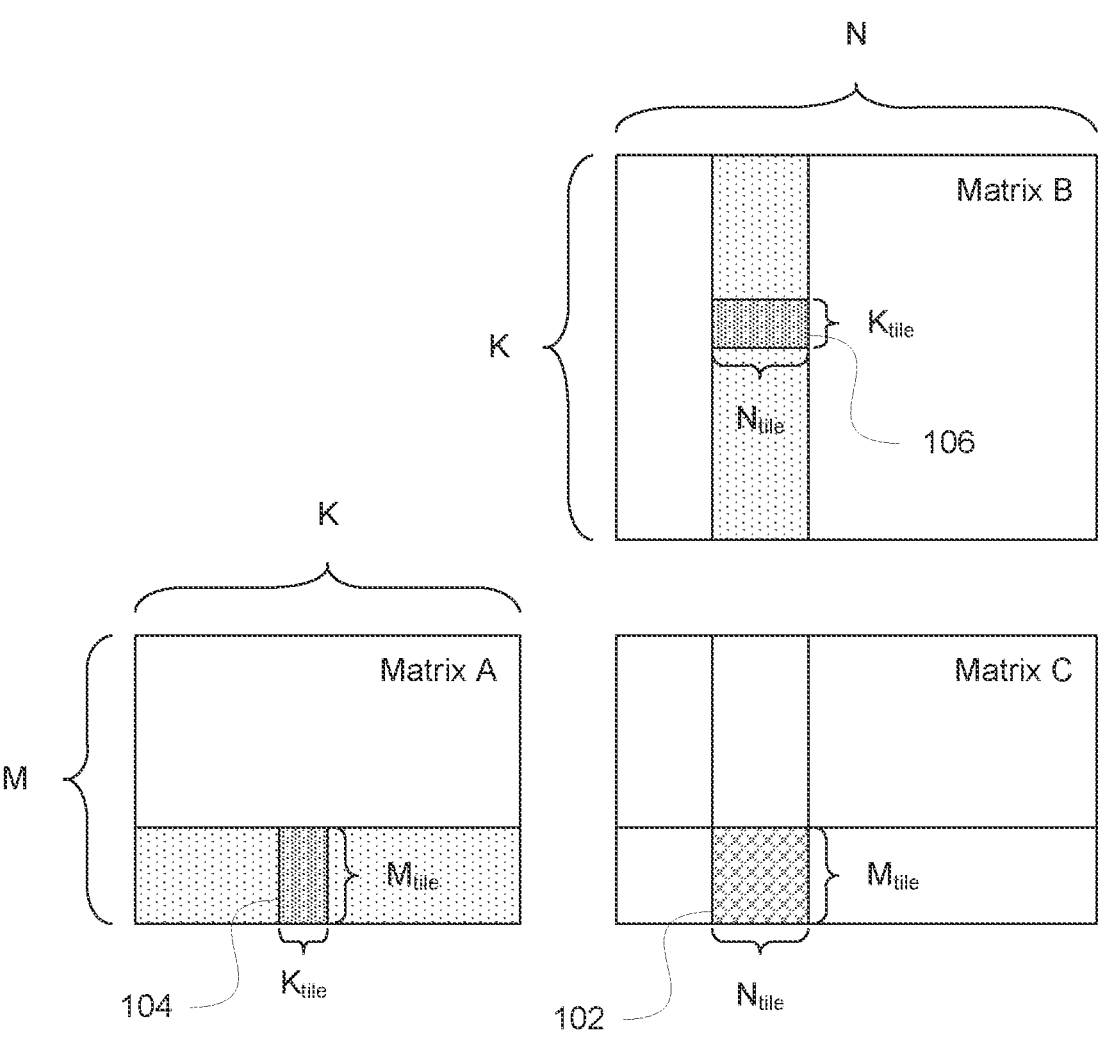
FIG. 1A illustrates a Generalized Matrix Multiplication operation, in accordance with an embodiment.

Software developers may want to create programs for a large variety of applications that perform various calculations. Calculations involving matrices are becoming more and more common, especially in the areas of HPC and DL, as set forth above. It will be appreciated, however, that calculations involving input operands or output operands specified as matrices may find use in applications outside of the HPC or DL context as well.

A software developer will typically write a program designed to be executed on a host processor, such as a 32-bit or 64-bit central processing unit (CPU). However, these programs may be enhanced by taking advantage of one or more specialized co-processors such as a graphics processing unit (GPU), parallel processing unit (PPU), vector processors, or the like. A kernel may be launched on the PPU using an application programming interface (API) implemented by a driver. The kernel may define a number of thread blocks configured to execute a number of threads in parallel to process different data using a similar set of instructions. In addition, the threads can include instructions configured for specialized logic units such as a load/store unit or a tensor core. The driver refers to a software program that executes on the host processor and causes signals to be transmitted over a bus or other communication fabric that connects the host processor with the PPU. These signals cause the PPU to execute commands on the logic units of the PPU.

Similar to a driver, a runtime API refers to a software program that runs on top of the driver. Instead of calling the driver functions directly from the top-level software program, the program can call functions of the runtime API, which in turn calls driver functions. The runtime API can make creating code in the top-level software program easier because it lacks some of the fine-grain control available in the API implemented by the driver. For example, the driver API may allow a programmer to control contexts for execution that enable the programmer to handle creation, launch, and deletion of individual kernels on the PPU. In contrast, the runtime API may allocate and manage contexts automatically without exposing control of individual kernels to the programmer. An example of a runtime API is the NVIDIA® CUDA Runtime API, which enables general compute functions to be executed in a parallel environment on NVIDIA GPUs.

Additional libraries may be implemented on top of the runtime API and/or driver. These additional libraries may provide specialized functions that are optimized for execution on the PPU, by using function calls into the runtime API and/or driver API. The use of these libraries can vastly improve the programmer's job when writing the top-level program code by being able to use a simple function call defined by the library rather than writing out each function they want to use making calls to the lower-level runtime API or driver API.

In an embodiment, a library may be provided for implementation of Basic Linear Algebra Subprograms (BLAS), which can include calls to a runtime API such as the CUDA Runtime API. The BLAS library may implement an API for executing various linear algebra operations on operands including vectors or matrices. The Level 1 BLAS perform scalar, vector and vector-vector operations, the Level 2 BLAS perform matrix-vector operations, and the Level 3 BLAS perform matrix-matrix operations. The top-level program would call a function defined in the BLAS library API, and the library handles the task of copying input operands to a shared memory of the PPU, launching the kernels to execute the desired operation(s) in the PPU, and reading a result from the shared memory. In certain cases, the library can be configured to launch operations on two or more PPUs simultaneously such that the operation can be distributed across multiple hardware units. The library can also define a format of input and output operands, such as specifying whether elements of the matrices are stored in row-major or column-major order.

As new PPUs have been developed that include specialized logic units such as vector processing units or tensor cores, the library can be adapted to make use of these specialized logic units to speed up certain functions. Tensor cores, especially, can accelerate matrix multiplication operations, such as BLAS Level-3 (BLAS3) routines like GEMM, SYMM, SYRK, TRMM, etc. However, it will be appreciated that the dimension of a tensor core (e.g., a maximum size of a matrix that can be processed during one operation as the input or output operand) may be fixed and can vary between different PPU architectures. In contrast, the size of a matrix operand specified by the programmer may be arbitrary and may not align exactly with the dimension of the tensor core. Thus, the library may process the matrix multiplication operation by launching a number of different sub-operations, some of which may be optimized for the tensor core and others on more traditional floating-point arithmetic logic units. In some functions, or in some cases in particular functions, the tensor core may not be used at all. Thus, a simple matrix multiplication operation implemented on the host processor using the library can actually be executed, at least partially, on the PPU by launching a number of kernels using the tensor core to process some elements and/or a more conventional floating-point arithmetic logic unit to calculate other elements. The choice of implementation may depend on how well the arbitrary size of the input and/or output operands fits with the fixed size of the tensor cores implemented in a given PPU architecture.

One example of a matrix multiplication operation can be referred to as a General Matrix Multiplication (GEMM), which is defined as the following operation:

$$C = \alpha AB + \beta C, \tag{Eq. 1}$$

where $\alpha$ and $\beta$ are scalar values, A and B are input matrices of dimensions M rows by K columns (i.e., M×K) and K rows by N columns (i.e., K×N), respectively, and C is a pre-existing output matrix that is overwritten with the result and has dimensions of M rows by N columns (i.e., M×N). It will be appreciated that the product of AB has M×N elements, each of which is calculated as the dot-product of two K element vectors. Thus, a total of M×N×K FMA (fused multiply add) operations are needed to compute the product of AB, and each FMA operation is a combination of a multiply operation followed by an addition operation.

Current libraries implement GEMMS by partitioning the output matrix C into tiles, where each tile is assigned to a thread block (e.g., a CTA). The size of each tile is given as $M_{tile} \times N_{tile}$, where $M_{tile} < M$ and $N_{tile} < N$. Each thread block computes the corresponding output tile by stepping through the K dimension in the input matrices and accumulating the results in the output. FIG. 1A illustrates the partitioning of the GEMM operation. For example, a tile 102 of the output matrix C is calculated by loading a subset of elements 104 from the A matrix and a subset of elements 106 from the B matrix into a memory. Each row of elements in the subset of elements 104 is multiplied by corresponding elements in a column of elements in the subset of elements 106 and accumulated into one of the elements of the tile 102. The process is repeated for all K elements in the subset of rows of matrix A and the subset of columns of matrix B to complete the calculations for all $M_{tile} \times N_{tile}$ elements of tile 102. It will be appreciated that the size of $M_{tile}$, $N_{tile}$, and $K_{tile}$ can be optimized for the size of a thread block in the PPU architecture.

While the general case in GEMM operations is to assume that the input and output operands are densely populated (i.e., the data pattern of the matrices is rectangular or square and filled with predominantly valid non-zero values), this is not always the case. Sparsely populated matrices are possible (e.g., where only a small percentage of elements in the matrices are non-zero values), although the non-zero values may be distributed evenly throughout the matrix such that most tiles of the output matrix require at least one computation (e.g., FMA operation) to be performed. In other cases, the data pattern corresponding to valid elements can be non-rectangular (e.g., triangular). A triangular matrix is a square matrix (e.g., M=N, M=K or N=K) whose only elements that are valid are either above or below the main diagonal. Only the valid part of the triangular matrix is allowed to be read or written to. An upper triangular matrix has valid values above the main diagonal, and a lower triangular matrix has valid values below the main diagonal. The triangular matrix has a triangular data pattern, but symmetric and Hermitian matrices also have a triangular data pattern as one half of the square matrix is a copy of a transposed version of the other half of the square matrix or a copy of a transpose of a complex conjugate version of the other half of the square matrix. The transposed triangular part of the matrix is inferred during the operation from the valid triangular part of the matrix. Symmetric and Hermitian matrices can either be an input operand or an output operand based on the BLAS3 operation. These data patterns can be exploited to speed up these operations.

Figure 1B:
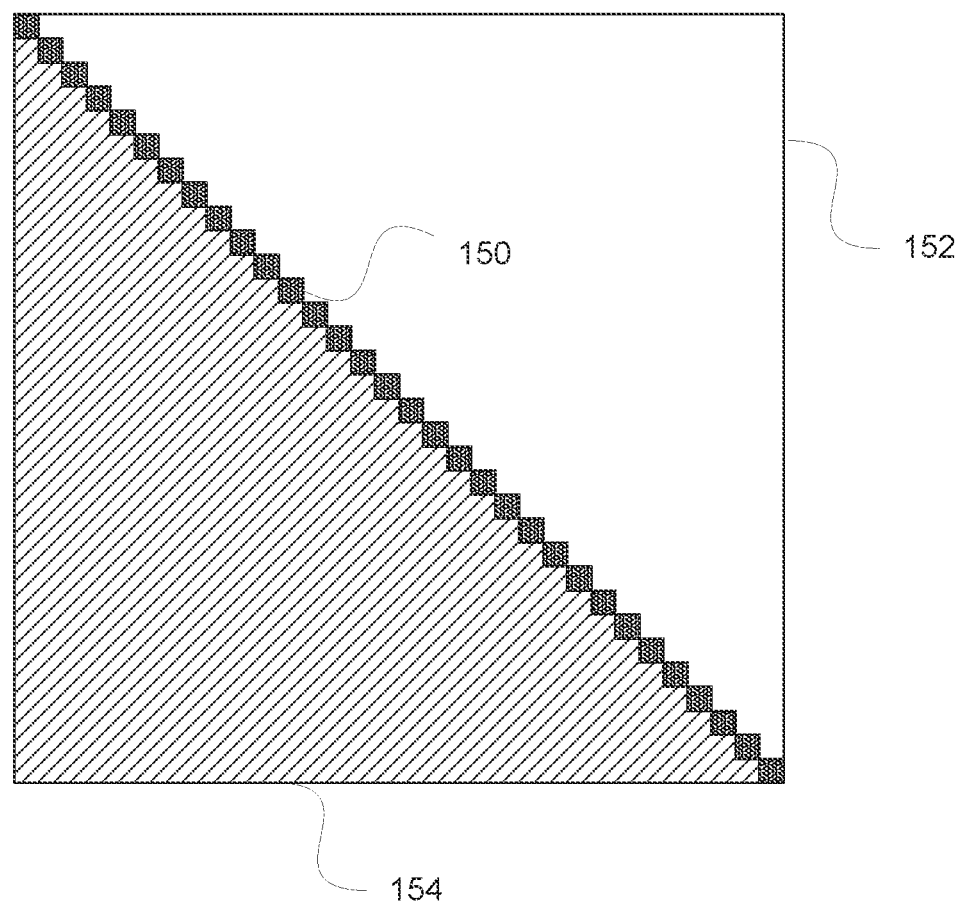
FIG. 1B illustrates a triangular data pattern for a square matrix, in accordance with an embodiment.

FIG. 1B illustrates a square matrix with a triangular data pattern. The square matrix has equal number of rows and columns, such that elements on a main diagonal 150 divide the matrix into a first subset of elements 152 above (or to the right of) the main diagonal and a second subset of elements 154 below (or to the left of) the main diagonal. When all elements in the first subset of element 152 are invalid, then the matrix is a lower triangular matrix, and when all elements in the second subset of elements 154 are invalid, then the matrix is an upper triangular matrix.

Conventional BLAS3 library functions, such as for the GEMM operation described above, when applied to the functions with input or output being triangular/symmetric/Hermitian matrices, may be configured to simply execute the operation as if the full rectangular input was available, even though substantial half of the arithmetic operations may result in a multiply by an invalid value and subsequent accumulate with the incorrect/invalid values. Execution of the standard GEMM operation may be much slower in such cases because a number of clock cycles are used to calculate values that do not and should not change the result and are known to be invalid a priori.

One potential optimization of the GEMM operation, with symmetric output operand, is to drop the calculations or tiles that fall entirely above or below the main diagonal where the result is known to be invalid. This type of operation can speed up the execution compared with the conventional naïve approach of processing all elements of the output operand regardless of whether the elements are valid or invalid. However, such implementations tend to either process all operations using a conventional floating-point arithmetic logic unit or use a tensor core only when the portion of the output operand being processed for a tile fall entirely on the valid side of the main diagonal. For portions of the output operand that do intersect the main diagonal, some elements may be valid while other elements may be invalid, and these operations may be entirely performed using a conventional floating-point arithmetic logic unit, thereby avoiding the efficiency increase due to the use of the tensor cores and further complicating the implementation on the PPU. Such implementations require the library to launch at least two different kernels on the PPU, a first kernel that utilizes the tensor core(s) and a second kernel that utilizes the floating-point arithmetic logic unit(s). Managing different kernels for different elements of the output matrix introduces additional complexities that add to latency for finishing the calculation. Thus, it is an objective of the embodiments of the library disclosed herein to utilize a single kernel, implemented on the tensor core(s), for processing all elements of the output operand, while also masking out invalid elements to improve performance.

In an embodiment, a library for BLAS3 functions is configured to implement new functions designed specifically for matrix operands, either input operands or output operands, having a triangular data pattern. The library implements these functions using a single kernel that utilizes the tensor core for all valid calculations. This vastly simplifies the operation by treating most tiles of the output matrix the same, and simply masking out data read/write for tiles operating on or near the main diagonal of either the input and/or output operand. These changes have been shown to increase the speed of these functions for triangular matrices by between two times to seven times compared to the speed of the conventional functions.

Further, the GEMM operation is not the only operation that lends itself to the type of optimizations that show improvement for non-rectangular data patterns, which can be applied to various operations including, but not limited to, a symmetric matrix to matrix multiplication (SYMM) operation, a symmetric rank k (SYRK) operation, a symmetric rank 2k (SYR2K) operation, a Hermitian matrix to matrix multiplication (HEMM) operation, a Hermitian rank k (HERK) operation, a Hermitian rank 2k (HER2K) operation, and a triangular matrix to matrix multiplication (TRMM) operation can be implemented by the library and optimized using the techniques described herein.

The SYMM/HEMM operations are defined as:

$$C=\alpha AB+\beta C, \text{ or } C=\alpha BA+\beta C, \qquad \text{(Eq. 2)}$$

where A is a symmetric or Hermitian matrix, respectively, and B and C are matrices of dimensions M×N.

The SYRK operation is defined as:

$$C=\alpha AA^T+\beta C, \text{ or } C=\alpha A^TA+\beta C, \qquad \text{(Eq. 2)}$$

where C is a symmetric matrix, A is a matrix of dimension N×K in the first case and K×N in the second case, and $A^T$ is the transpose of matrix A.

The SYR2K operation is defined as:

$$C=\alpha(AB^T+BA^T)+\beta C, \text{ or } C=\alpha(A^TB+B^TA)+\beta C \qquad \text{(Eq. 3)}$$

where C is a symmetric matrix, A and B are matrices of dimension N×K in the first case and K×N in the second case, $A^T$ is the transpose of matrix A, and $B^T$ is the transpose of matrix B.

The HERK operation is defined as:

$$C=\alpha AA^H+\beta C, \text{ or } C=\alpha A^HA+\beta C \qquad \text{(Eq. 4)}$$

where C is a Hermitian matrix, A is a matrix of dimension N×K in the first case and K×N in the second case, and $A^H$ is the conjugate transpose of matrix A.

The HER2K operation is defined as:

$$C=\alpha AB^H+\overline{\alpha}BA^H+\beta C, \text{ or } C=\alpha A^HB+\overline{\alpha}B^HA+\beta C \qquad \text{(Eq. 5)}$$

where C is a Hermitian matrix, A and B are matrices of dimension N×K in the first case and K×N in the second case, $A^H$ is the conjugate transpose of matrix A, and $B^H$ is the conjugate transpose of matrix B.

The out-of-place TRMM operation is defined as:

$$C=\alpha op(A)B, \text{ or } C=\alpha Bop(A) \qquad \text{(Eq. 6)}$$

where A is a triangular matrix, and B and C are matrices of dimension M×N. The term op(A) can refer to A, $A^T$ or $A^H$.

A symmetric matrix is a square matrix that is equal to its transpose (i.e., the element in the i-th row and j-th column is equal to the element in the j-th row and i-th column), and a Hermitian matrix is a complex square matrix that is equal to its conjugate transpose (i.e., the element in the i-th row and j-th column is equal to the complex conjugate of the element in the j-th row and i-th column). In some operations, such as SYRK/SYR2K/HERK/HER2K operations, only one half of the output matrix needs to be calculated explicitly and then the other half of the output can be inferred from the valid results. In an embodiment, the SYR2K and HER2K operations are split into two steps inside a single kernel where each step resembles SYRK and HERK computations, respectively.

In an embodiment, the TRMM operation can include two variants. A first variant treats values on the diagonal as inherently valid. A second variant treats values on the diagonal as implicitly 1 and, therefore, can avoid explicitly reading these values from memory.

Figure 2A:
FIG. 2A illustrates a block diagram of a multi-processor system, in accordance with an embodiment.

FIG. 2A illustrates a system 200 configured to perform matrix operations for matrices having non-rectangular data patterns, in accordance with some embodiments. As shown in FIG. 2A, the system 200 includes a host processor 202 such as a central processing unit (CPU) and a parallel processor 204 such as a parallel processing unit (PPU). The host processor 202 is connected to a memory 206, and the parallel processor 204 is connected to a memory 208. The memory 206 provides a memory space associated with the host processor 202 and the memory 208 provides a memory space associated with the parallel processor 204. Although not shown explicitly, either the host processor 202 and/or the parallel processor 204 may initiate direct memory access (DMA) operations that can copy data from the memory 206 to the memory 208, or from the memory 208 to the memory 206. In other embodiments, the memory 206 and/or the memory 208 may be a shared memory that is accessible by both the host processor 202 and the parallel processor 204.

The memory 206 includes an application 210, a BLAS library 220, a runtime API 230, and a driver 240, which each comprise one or more instructions configured to be executed by the host processor 202. The memory 208 includes a kernel 250, which comprises one or more instructions configured to be executed by the parallel processor 204. In some embodiments, the kernel 250 can be stored in the memory 206 and loaded into the memory 208 as needed prior to execution of the kernel 250.

The parallel processor 204 includes at least one tensor core that is configured to speed up matrix multiplication operations. The kernel 250 is configured to execute matrix multiplication operations of a fixed size using the tensor core. A matrix multiplication operation of arbitrary size can be implemented using one or more matrix multiplication operations of fixed size in the tensor core or by executing multiple matrix multiplication operations in parallel on multiple tensor cores.

Figure 2B:
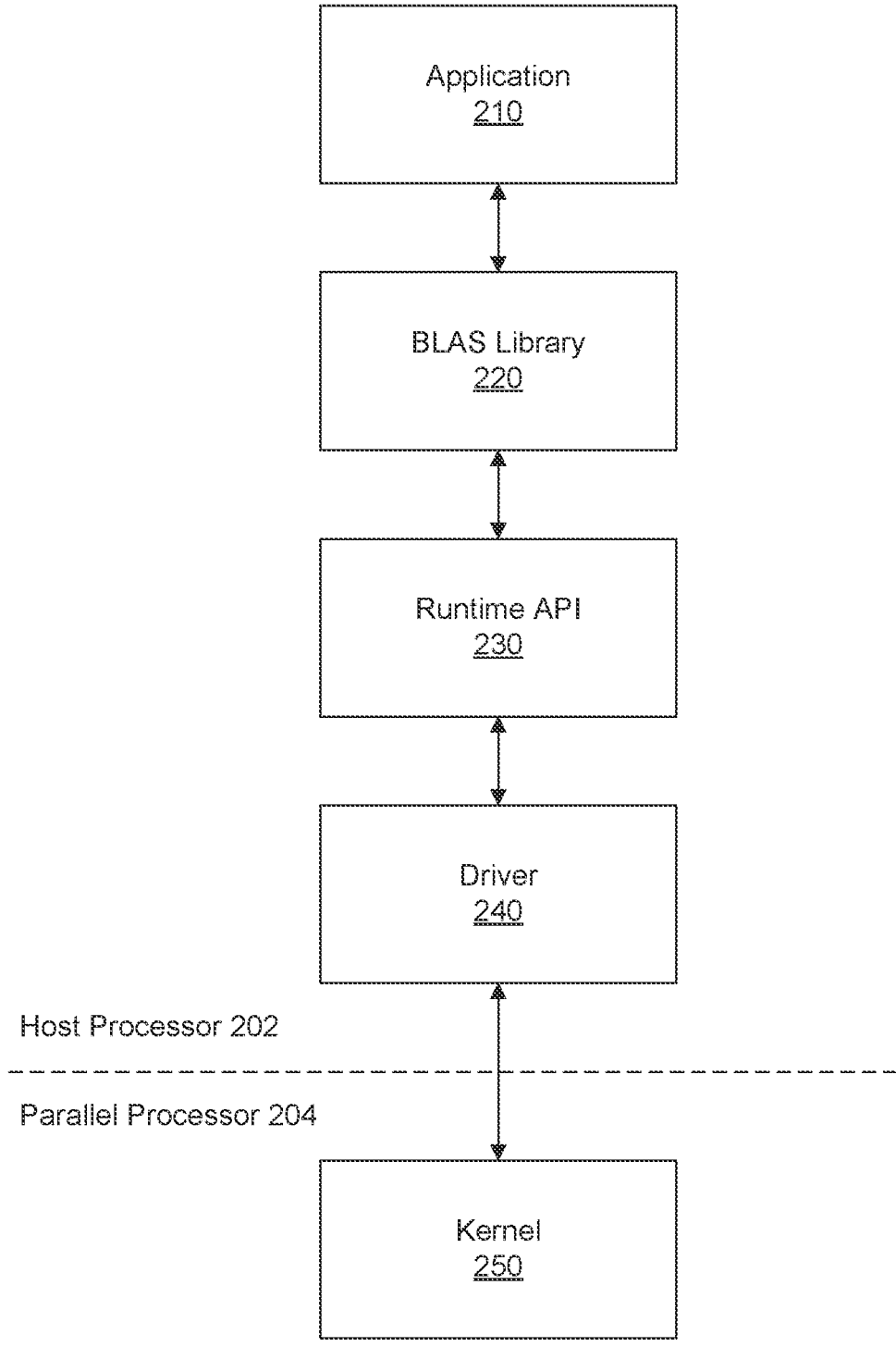
FIG. 2B illustrates a software stack that includes a basic linear algebra subprogram (BLAS) library, in accordance with an embodiment.

FIG. 2B is a conceptual illustration of a software stack, in accordance with an embodiment. The application 210 is stored in a memory space of the host processor 202 and configured to be executed by the host processor 202. The memory space of the host processor 202 may also store the BLAS library 220, the runtime API 230, and the driver 240. The set of software modules including the application 210, the BLAS library 220, the runtime API 230, and the driver 240 may be referred to as a software stack. In some embodiments, one or more of the software modules may be combined into a single software module. For example, the functionality of the runtime API 230 could be incorporated into the driver 240 as a single software module. Alternatively, the functionality of the BLAS library 220 and runtime API 230 could be incorporated into a single software module. In yet other embodiments, the functionality of the runtime API 230 and/or BLAS library 220 could be imported into source code for the application 210, which is compiled into a single binary executable application.

The kernel 250 is stored in a memory space of the parallel processor 204 and configured to be executed by the parallel processor 204. The driver 240 can transmit instructions to the parallel processor 204 that cause the kernel 250 to be executed by the parallel processor 204. The kernel 250 includes instructions that may, e.g., execute thread blocks on one or more cores of the parallel processor 204. The threads may cause the parallel processor 204 to launch a matrix multiplication operation to be executed by a tensor core. As used herein, launching a matrix multiplication operation may comprise loading elements of one or more input operands into a register file or shared memory of the parallel processor 204, executing the matrix multiplication operation on the tensor core to compute a result stored in an output operand in the register file or shared memory of the parallel processor 204, and storing the output operand from the register file or shared memory of the parallel processor 204 back to a memory space of the parallel processor 204 or a memory space of the host processor 202.

In an embodiment, each of the BLAS library 220, the runtime API 230, and the driver 240 may implement an API that may be called by the software module above the BLAS library 220, the runtime API 230, and the driver 240 in the software stack, respectively. In other words, the application 210 calls an API implemented by the BLAS library 220 in order to initiate a matrix multiplication operation in accordance with the API. The BLAS library 220 may then in turn call an API implemented by the runtime API 230, and the runtime API 230 may call an API implemented by the driver 240. All such calls are initiated in either the user space or the kernel space of the operating system (not shown explicitly) running on the host processor 202. The driver 240 may launch the kernel 250 on the parallel processor 204 in order to execute the matrix multiplication operation on the parallel processor 204.

The kernel 250 consists of a number of instructions for executing the matrix multiplication operation on the cores of the parallel processor 204. In an embodiment, the kernel 250 comprises instructions to execute, on each of one or more tensor cores, at least a portion of the matrix multiplication operation. For example, the parallel processor 204 can be configured to generate elements for a first tile of the output operand via a first tensor core and generate elements for a second tile of the output operand via a second tensor core, where the first tensor core and the second tensor core operate in parallel (e.g., substantially simultaneously).

In an embodiment, the BLAS library 230 can be configured to perform matrix multiplication operations involving matrices having triangular data patterns. In one case, an input operand of the matrix multiplication operation is a square matrix having a triangular data pattern (i.e., a triangular matrix, a symmetric matrix, or a Hermitian matrix). In another case, an output operand of the matrix multiplication operation is a square matrix having a triangular data pattern.

For example, the TRMM operation (e.g., Left-Side Mode: C=αop(A)B) includes two input operands A and B, where A is a triangular matrix of dimension M×M and B is a rectangular matrix of dimension M×N. The TRMM operation has an output operand C that is also a rectangular matrix of dimension M×N. The BLAS library 230 can be configured such that matrix A is defined as either an upper triangular matrix or a lower triangular matrix. The matrix C is divided (i.e., partitioned) into tiles and a kernel 250 is launched to process the elements of each tile of matrix C using the tensor core(s) of the parallel processor 204. To compute each tile of matrix C, the elements of matrix A are processed from left-to-right and the elements of matrix B are processed from top-to-bottom moving along the K dimension, based on the size of tensor core(s).

It will be appreciated that each tile of the output operand C is processed by computing dot products that correspond to a subset of the rows of input operand A and a subset of the columns of input operand B. The subset of rows of the input operand A and the subset of columns in the input operand B corresponding to the tile are then further partitioned into sub-tiles along the dimension K. A sub-tile of input operand A has dimensions $M_{tile} \times K_{tile}$, and a sub-tile of the input operand B has dimensions $K_{tile} \times N_{tile}$. Each pair of corresponding sub-tiles for the two input operands can be sized to fit in a single tensor core, and a thread block can be configured to process a number of sub-tiles for the tile on one or more tensor cores in order to generate partial results for different elements of the tile of the output operand C.

The processing for the elements of the tile is performed by a number N of iterations along the K dimension, with $N=K/K_{tile}$. However, the BLAS library 230 can be configured to prevent the processing of certain sub-tiles of the input operand A either above or below the main diagonal depending on whether matrix A is a lower triangular or upper triangular matrix, respectively. In other words, for those sub-tiles where all elements of the sub-tile are known to be invalid, the processing of the sub-tile is not launched on the parallel processor because the output of those calculations is not added to the value for the corresponding elements of the tile of the output operand C. Furthermore, when a sub-tile intersects the main diagonal of the square matrix, some elements of the sub-tile may be masked out to prevent those elements from being computed. Masking out, as used herein, can refer to preventing the element from being loaded from a memory into a memory space of the parallel processor 204 and/or a register file in the parallel processor 204. This can include explicitly replacing the value for invalid elements by a value of zero in the memory space of the parallel processor 204 for the computational purposes in the tensor core, disabling at least a portion of a logic unit within the tensor core to prevent generation of a value generated by that portion of the logic unit, and/or preventing the writing of a value generated by the tensor core into a register file or a memory space of the parallel processor 204.

For a second variant of TRMM that treats values on the diagonal as implicitly 1, an added operation can be performed to mask out elements on the diagonal from being loaded from the memory and being implicitly replaced by a value of one in a memory space of the parallel processor 204 and/or a register file in the parallel processor 204. Optionally, masking out can also refer to disabling at least a portion of a logic unit, such as a portion of the tensor core, to prevent generation and/or writing out of a value generated by that portion of the logic unit to the register file and/or the memory space of the parallel processor 204. For each tile of the output matrix C, the BLAS library 230 only launches a kernel to process the elements to the left of (in the case of a lower triangular matrix) or to the right of (in the case of an upper triangular matrix) the main diagonal. All other elements of input matrix A are inferred to be zero and are not loaded into a memory space of the parallel processor 204. Additionally, the number of iterations that are performed within a tile/thread block can be minimized and limited to only those iterations that are associated with valid elements of both input operands A and B.

It will be appreciated that the matrix C in the TRMM operation is not required to be a square matrix (e.g., M≠N) and, therefore, may not conform to a triangular data pattern. Still, the total number of operations for computing the elements of C can be reduced by substantially half compared to the naïve approach of a GEMM operation. Furthermore, the implementation of the BLAS library 230 does not launch multiple kernels for calculating intermediate results on different units of the parallel processor. All results are calculated in the same manner on the tensor core(s) of the parallel processor 204 in order to effectively use the increased efficiency of the tensor cores compared to conventional floating-point arithmetic logic units.

As another example, the SYRK operation has an input operand A that is a rectangular matrix of dimension N×K. However, the resultant matrix $(AA^T)$ within the matrix multiplication operation is a symmetric matrix of dimension N×N. It will be appreciated that multiplying a rectangular matrix by its transpose results in a symmetric matrix having a triangular data pattern. Therefore, the computations can be reduced significantly by only computing roughly one half of the resultant matrix $AA^T$ (e.g., the main diagonal plus either the portion above or below the main diagonal). In other words, if the elements of the lower triangular portion of the matrix are computed (exclusive of the elements along the main diagonal), then the elements of the upper triangular portion of the matrix can be inferred without computing the dot products of the input operands corresponding to those tiles in the upper triangular portion of the matrix (which would require many more multiplication and addition operations). Thus, the number of thread blocks that are launched within the kernel is minimized and limited to only those tiles that are associated with valid elements of output operand C. For the tiles where all output elements lie on the valid side of output matrix C, the calculations performed are similar to the calculations performed for the GEMM operation. Whereas for the tiles which compute elements on and near the main diagonal of matrix C, the thread blocks mask out the elements that lie on the invalid side of the main diagonal while storing data from the register files into the memory for those elements that lie on the valid side of the main diagonal. The tiles that lie completely on the invalid side of the main diagonal of the matrix C can either be dropped completely or rearranged in order to compute valid side of matrix C. Thus, reducing the computations and necessary computational resources to approximately half of that compared with a conventional approach. The results of this resultant matrix can then be added to the pre-existing elements of the output operand C, optionally after being scaled by scalar values α and β, respectively.

As yet another example, the HERK operation has an input operand A (where the elements are complex values) that is a rectangular matrix of dimension N×K. The resultant matrix of $AA^H$ is a Hermitian matrix of dimension N×N. It will be appreciated that multiplying a rectangular matrix of complex values by its conjugate transpose results in a Hermitian matrix having a triangular data pattern. Therefore, the computations can be reduced significantly by only computing roughly one half of the resultant matrix $AA^H$ (e.g., the main diagonal plus either the portion above or below the main diagonal) just like the SYRK operation as described above. The operations and optimization described above in the SYRK operation apply for the HERK operation too. One additional change for the HERK operation compared to the SYRK operation is that only the real part of the elements that lie on the main diagonal are stored in the memory from the register files, and the imaginary part of the elements that lie on the main diagonal are masked out. The values of this resultant matrix can then be added to the values of the pre-existing elements of the output operand C, optionally after being scaled by scalar values a and (3, respectively.

In an embodiment, the SYMM and HEMM operations are performed in two steps, inside a single kernel, with each step resembling a TRMM computation with the input operand A being a symmetric and a Hermitian matrix, respectively. In a first TRMM step, the computations are performed using the valid data of the matrix A. Whereas, in a second TRMM step, the computations are performed using the valid data of matrix A, but with each valid element being treated as being on the transposed coordinates. That is the element in the i-th row and j-th column of matrix A is inferred to be the element in the j-th row and i-th column for the second TRMM step. The second TRMM step also assumes the elements on the main diagonal of matrix A as zeroes since the first TRMM operation has already considered the main diagonal elements during the computations. One additional change for the HEMM operation compared to the SYMM operation is that only the real part of the elements that lie on the main diagonal of matrix A are loaded from the memory, the imaginary part is explicitly replaced with zero.

Figure 2C:
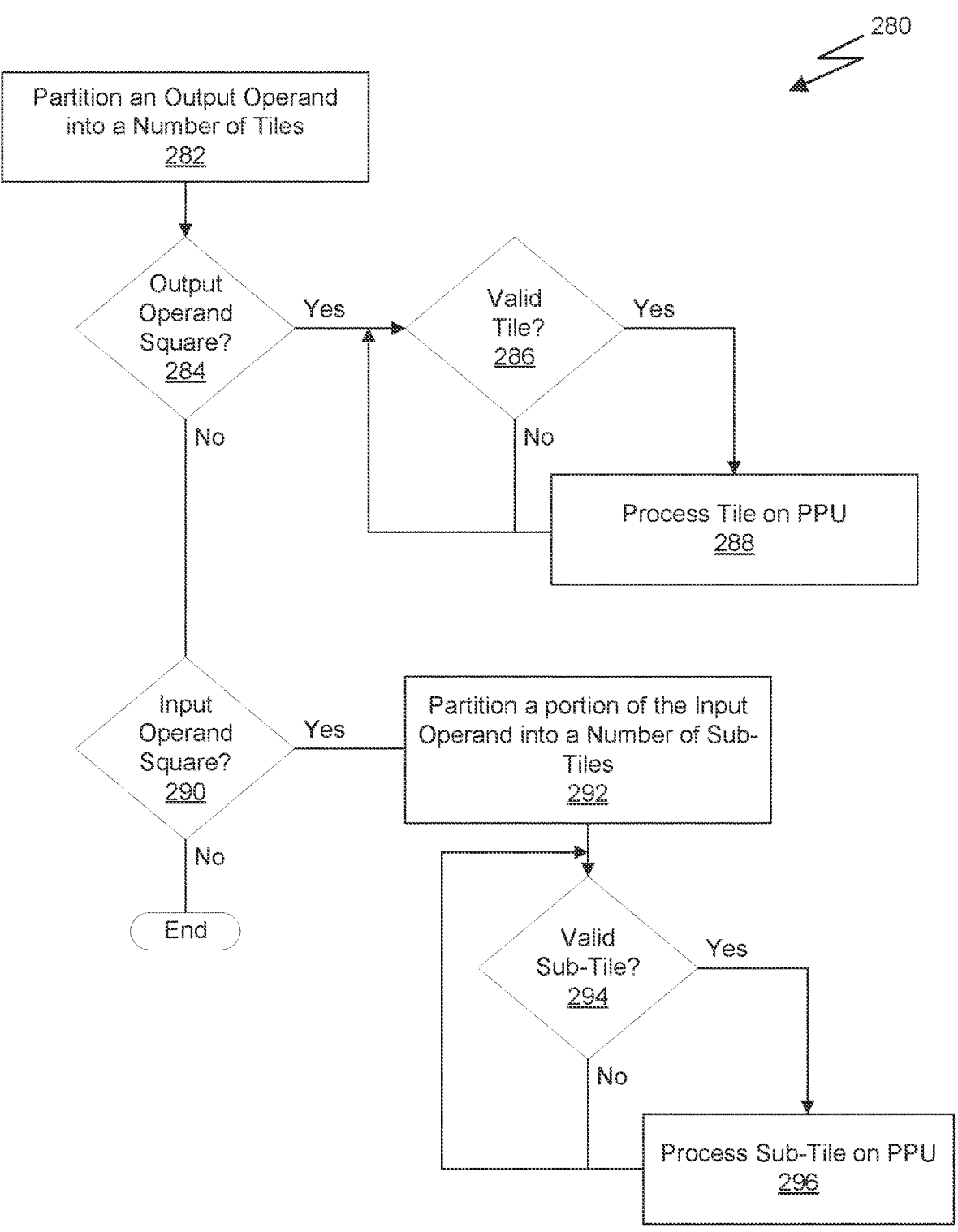
FIG. 2C is a method for performing a matrix multiplication operation, in accordance with an embodiment.

FIG. 2C illustrates a flowchart of a method 280 for performing a matrix multiplication operation, in accordance with an embodiment. Although method 280 is described in the context of at least one of a host processor or a parallel processor, the method 280 may also be performed by a program, custom circuitry, or by a combination of custom circuitry and a program. For example, portions of the method 280 may be executed by a CPU (central processing unit), PPU (parallel processing unit), or any processor or co-processor with one or more tensor cores. Furthermore, persons of ordinary skill in the art will understand that any system that performs method 280 is within the scope and spirit of embodiments of the present disclosure.

At step 282, an output operand of the matrix multiplication operation is partitioned into a number of tiles by a host processor. In an embodiment, a size of each tile may be pre-configured based on a size of the tensor cores in a parallel processor (e.g., based on a number of elements that can be loaded simultaneously into registers and processed by the tensor core to generate elements of the output operand). Each tile may perform several iterations based on the size of the tensor cores to process all required elements of the input operands that are needed to compute the elements of the output operand.

At step 284, the host processor determines whether an output operand of the matrix multiplication operation is a square matrix having a triangular data pattern. If the output operand is a square matrix having a triangular data pattern, then for each tile of the output operand, at step 286, the host processor determines whether the tile is valid based on a location of the tile relative to a main diagonal of the square matrix. A tile is valid if at least one element of the tile is valid (i.e., falls on one side of the main diagonal of the square matrix, or, in some cases, lies on the main diagonal of the square matrix). If the tile is valid, then, at step 288, an operation is launched on the parallel processing unit to generate values for the elements of the tile using the at least one tensor core. It will be appreciated that, if the tile intersects the main diagonal of the square matrix, then one or more elements of the tile can be masked out during the operation to reduce the number of computations for those elements of the tile that are invalid. Masking out elements can refer to one or more of: a portion of the elements of the input operands may not be read into a memory space of the parallel processor, one or more units of the tensor core may be disabled, and/or one or more values produced by the tensor core may not be written out to the memory space of the parallel processor by the tensor core. However, if the tile is invalid, then, the elements of the tile are prevented from being processed by the parallel processor by skipping step 288 for that tile.

At step 290, the host processor determines whether an input operand of the matrix multiplication operation is a square matrix having a triangular data pattern. If the input operand is a square matrix having a triangular data pattern, then for each tile of the output operand, at step 292, the host processor partitions a portion of the input operand into a number of sub-tiles associated with the tile of the output operand. At step 294, for each sub-tile of the input operand, the host processor determines whether the sub-tile is valid based on a location of the sub-tile relative to a main diagonal of the square matrix. If the sub-tile is valid, then, at step 296, an operation is launched on the parallel processing unit to generate values for the elements of the tile using the at least one tensor core to process the elements of the sub-tile. It will be appreciated that, if the sub-tile intersects the main diagonal of the square matrix, then one or more elements of the sub-tile can be masked out during the operation to reduce the number of computations for those elements of the sub-tile that are invalid. Masking out elements of the sub-tile can refer to one or more of: a portion of the elements of the input operands may not be read into a memory space of the parallel processor, one or more units of the tensor core may be disabled, and/or one or more values produced by the tensor core may not be written out to the memory space of the parallel processor by the tensor core. However, if the sub-tile is invalid, then the elements of the sub-tile are prevented from being processed by the parallel processor by skipping step 296 for that sub-tile.

The output operand of the matrix multiplication operation is returned to an application once the processing of all tiles in the output operand is completed. In some embodiments, the output operand of the matrix multiplication operation is utilized in a deep learning or high performance computing (HPC) application, such as in the computation of an output of a neural network or to determine a result of a simulation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

For example, the application 210 and BLAS library 220 can be designed to be used with a runtime API 230 and/or driver 240 configured for the PPU 300 described below. The PPU 300 may be connected to a host processor, such as a CPU, that executes one or more of the application 210, the BLAS library 220, the runtime API 230, and/or the driver 240. However, PPU 300 is merely one example of a parallel processor and other example architectures implementing at least one tensor core are within the scope of the present disclosure.

Parallel Processing Architecture

Figure 3:
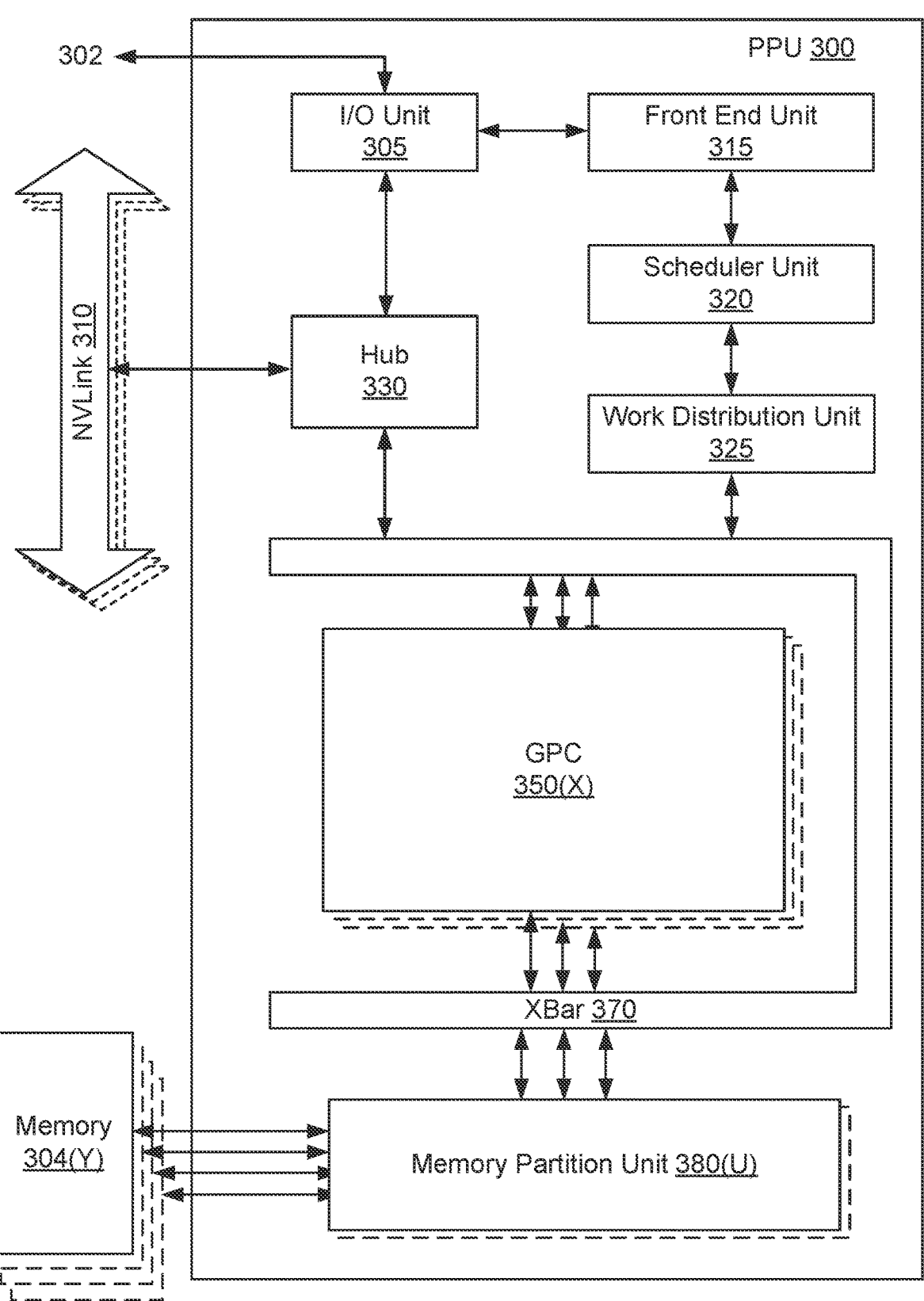
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including, without limitation: autonomous vehicle platforms, simulation, synthetic data generation, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for multi-dimensional assets, cloud computing, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnects. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number Y of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
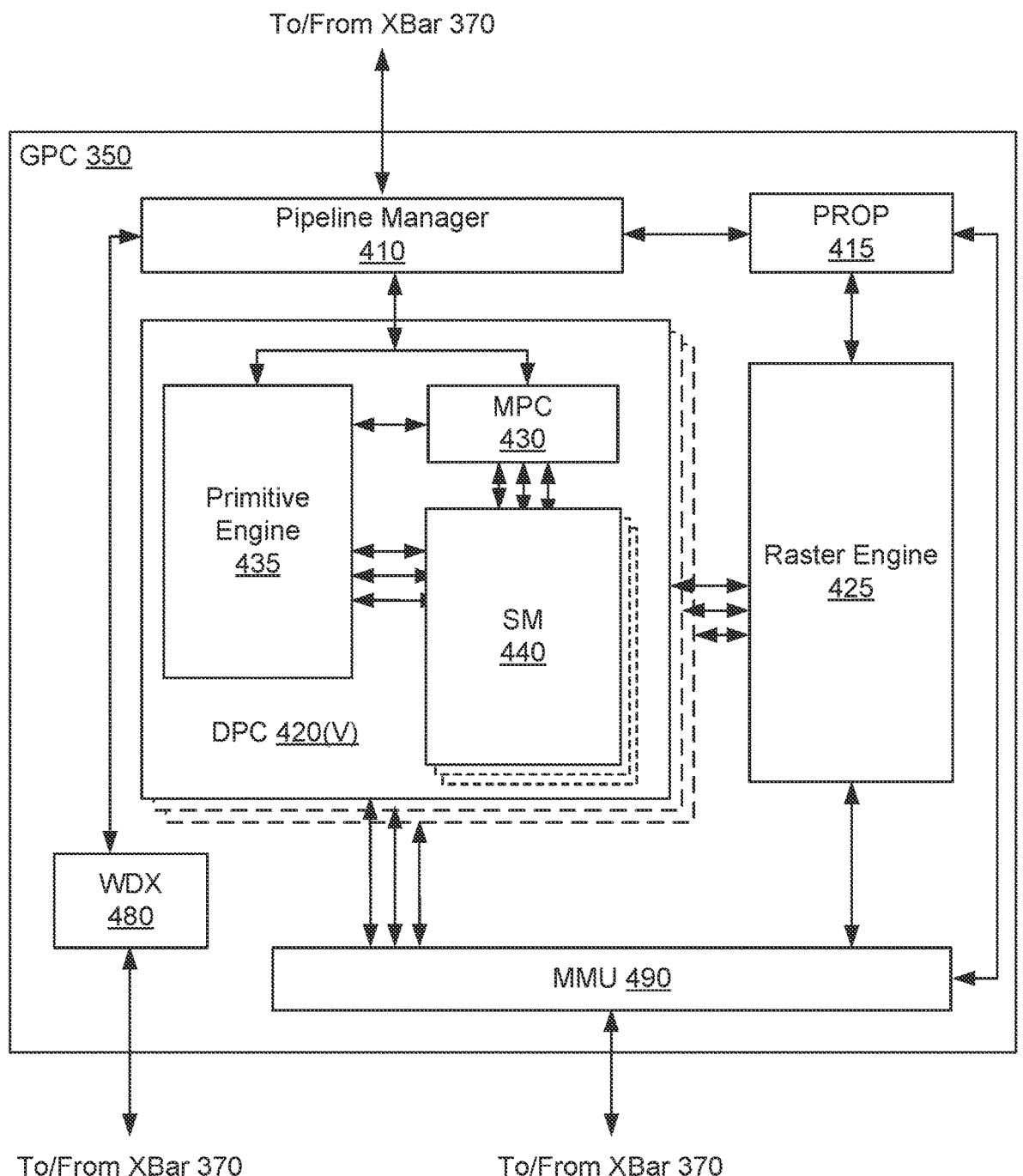
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
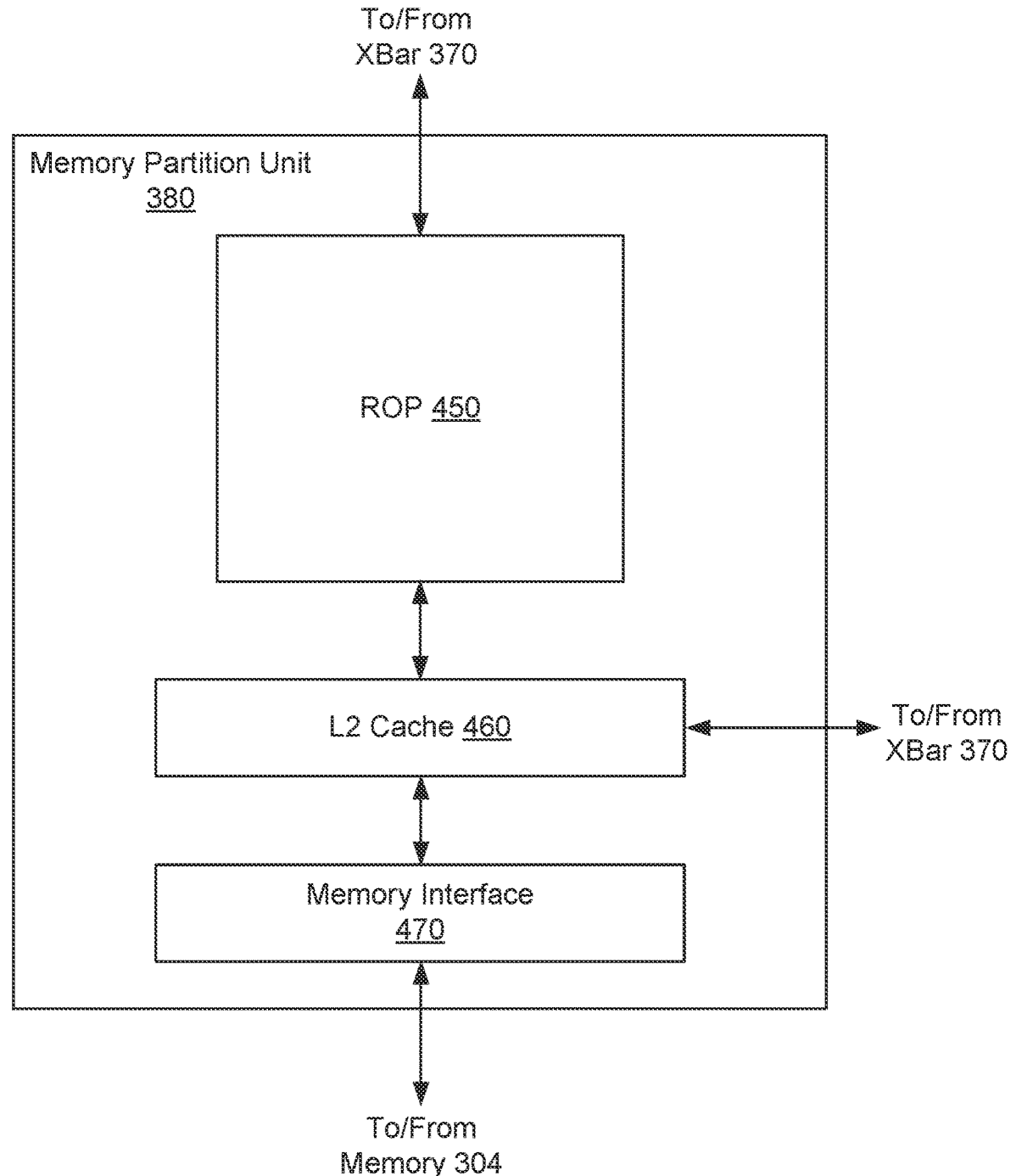
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory devices 304, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
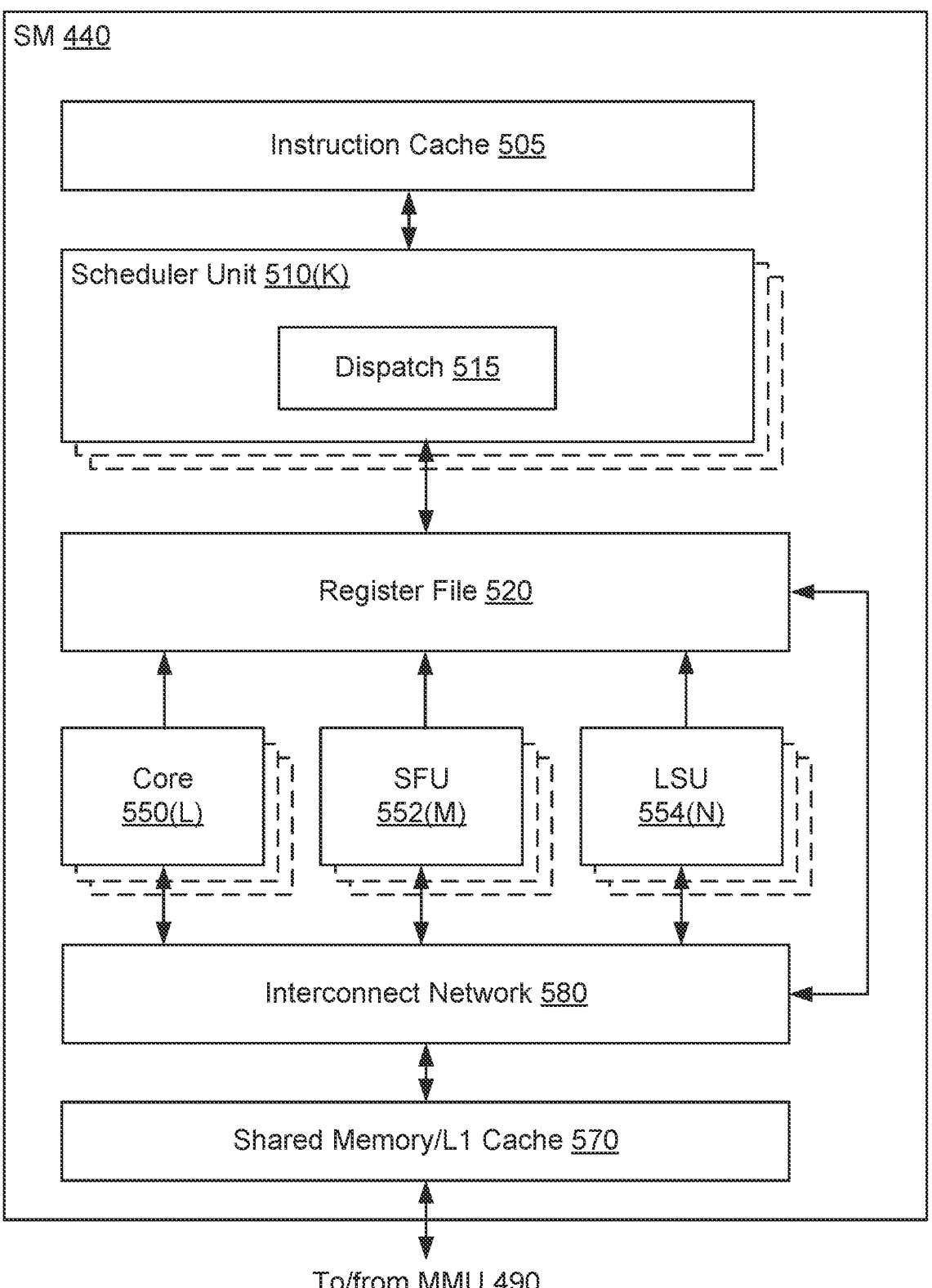
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, and a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other interme- diate products for a 4×4×4 matrix multiply. In practice, Tensor Cores are used to perform much larger two-dimen- sional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader pro- grams executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/ L1 cache 570, L2 cache 460, and memory 304 are backing stores.

Combining data cache and shared memory functionality into a single memory block provides the best overall per- formance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computa- tion, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel compu- tation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to- analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
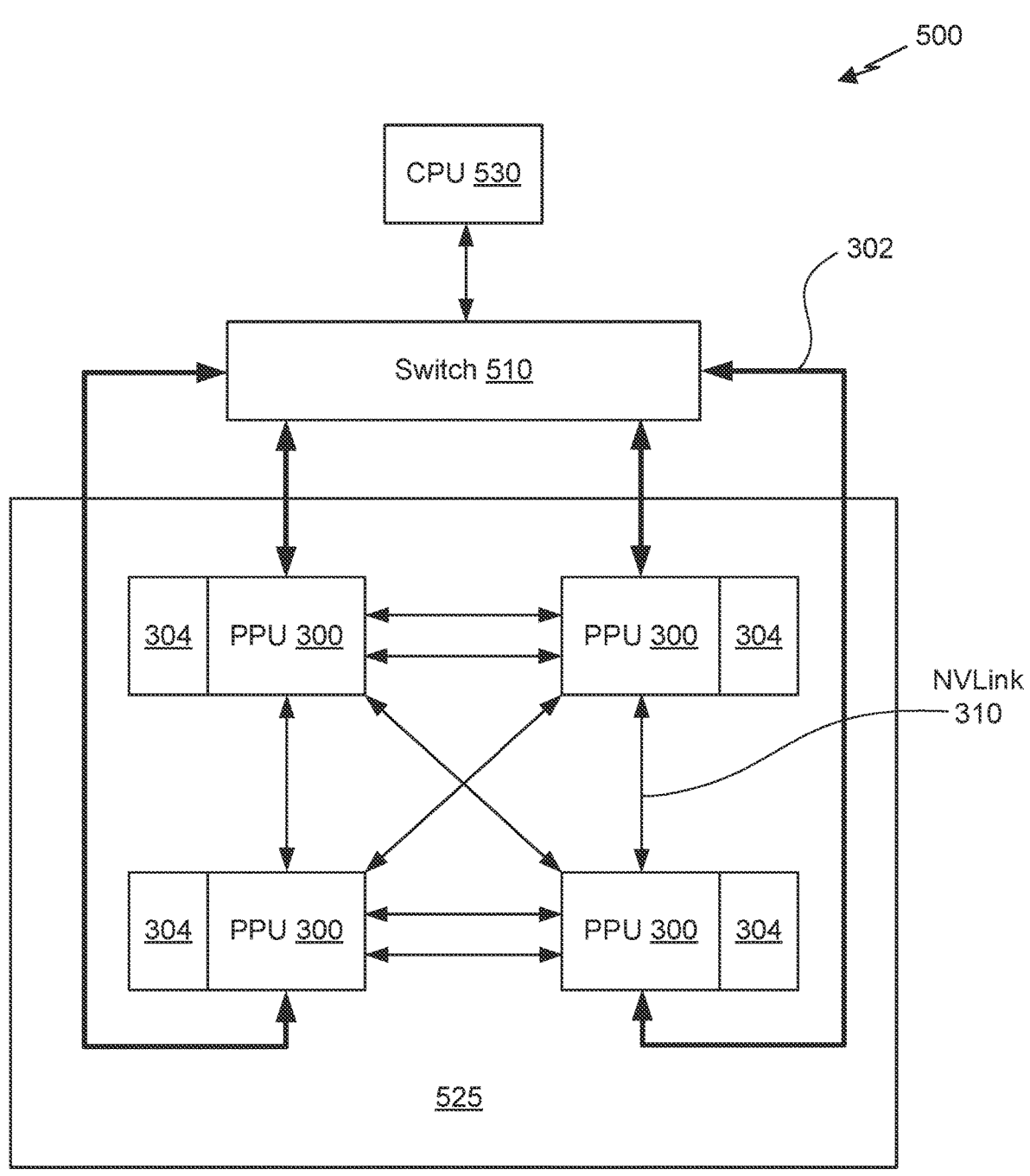
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accor- dance with an embodiment. The exemplary system 500 may be configured to implement the method 280 shown in FIG. 2C. The processing system 500 includes a CPU 530, switch 510, and multiple PPUs 300 each associated with respective memories 304. The NVLink 310 provides high-speed com- munication links between each of the PPUs 300. Although a particular number of NVLink 310 and interconnect 302 connections are illustrated in FIG. 5B, the number of con- nections to each PPU 300 and the CPU 530 may vary. The switch 510 interfaces between the interconnect(s) 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect(s) 302 and each of the PPUs 300. The PPUs 300, memories 304, and interconnect(s) 302 may be situated on a single semicon- ductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect(s) 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the memory space of the CPU 530. One or more of the NVLinks 310 may also be configured to operate in a low-power mode.

Figure 5C:
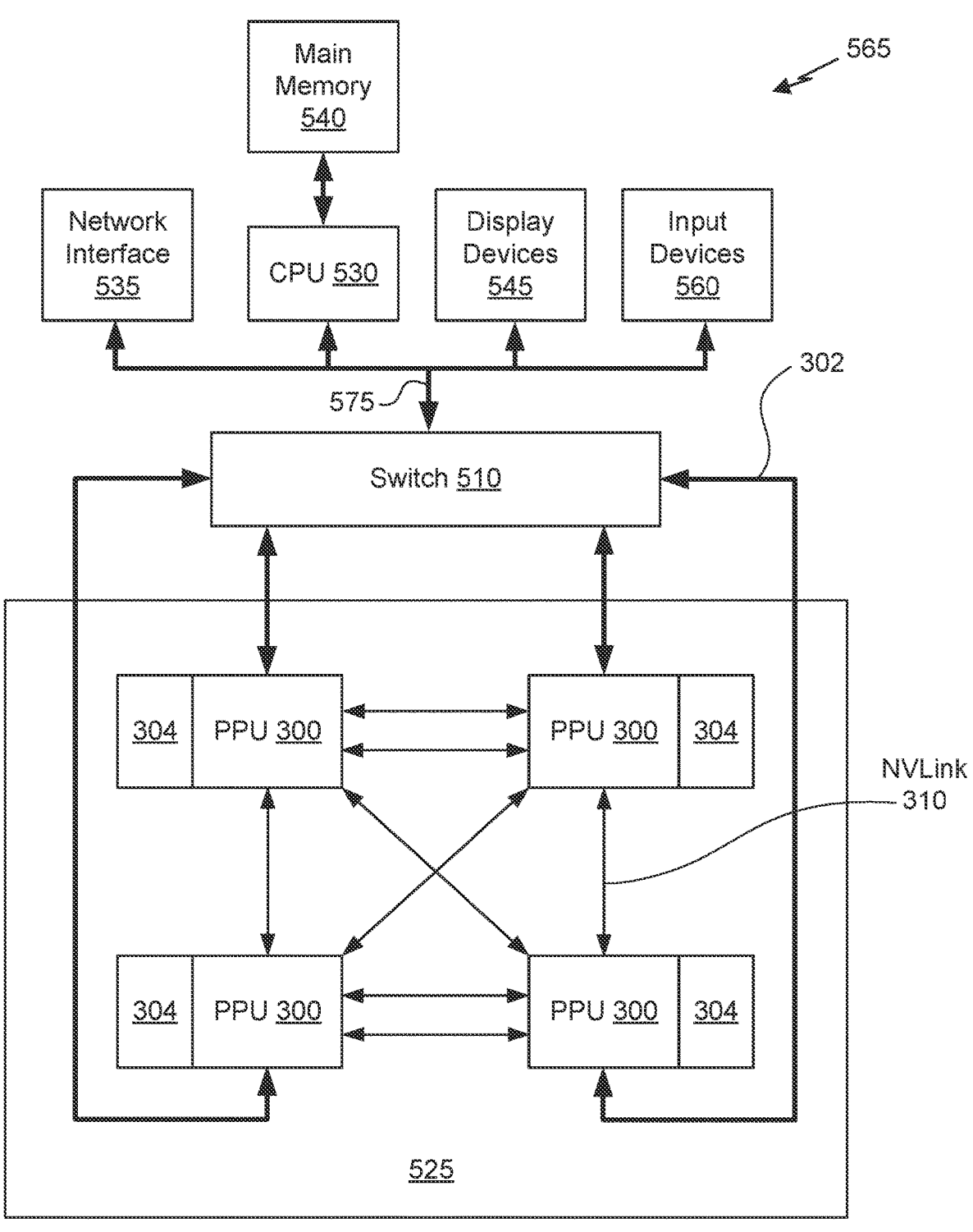
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 280 shown in FIG. 2C.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display, or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system, comprising:
a host processor;
a parallel processing unit including at least one tensor core; and
a memory storing instructions that, when executed by the host processor, cause the host processor to perform a matrix multiplication operation by:
partitioning an output operand of the matrix multiplication operation into a number of tiles;
responsive to determining that the output operand of the matrix multiplication operation is a square matrix having a triangular data pattern:
for at least one tile of the output operand:
determining whether the at least one tile is valid based on a location of the tile relative to a main diagonal of the square matrix, and
responsive to determining that the at least one tile is valid, launching an operation on the parallel processing unit to generate values for the elements of the at least one tile using the at least one tensor core, or
responsive to determining that the at least one tile is invalid, preventing the elements of the at least one tile from being processed by the parallel processing unit; or
responsive to determining that an input operand of the matrix multiplication operation is a square matrix having a triangular data pattern:
for at least one tile of the output operand:
partitioning a portion of the input operand into a number of sub-tiles associated with the at least one tile of the output operand,
for at least one sub-tile of the input operand, determining whether the at least one sub-tile is valid based on a location of the at least one sub-tile relative to a main diagonal of the square matrix, and
responsive to determining that the at least one sub-tile is valid, launching an operation on the parallel processing unit to generate values for the elements of the at least one tile using the at least one tensor core to process the elements of the at least one sub-tile, or
responsive to determining that the at least one sub-tile is invalid, preventing the elements of the at least one sub-tile from being processed by the parallel processing unit.

2. The system of claim 1, wherein the parallel processing unit includes a plurality of tensor cores, and the operation on the parallel processing unit is configured to:
generate elements for a first tile of the output operand via a first tensor core, and
generate elements for a second tile of the output operand via a second tensor core,
wherein the first tensor core and the second tensor core operate in parallel.

3. The system of claim 1, wherein, responsive to determining that the output operand of the matrix multiplication operation is the square matrix having the triangular data pattern, for at least one tile of the output operand, the host processor is further configured to:
determine whether the at least one tile intersects the main diagonal of the square matrix; and
responsive to determining that the at least one tile intersects the main diagonal of the square matrix, mask out at least a portion of the elements of the at least one tile on one side of the main diagonal.

4. The system of claim 1, wherein, responsive to determining that the input operand of the matrix multiplication operation is the square matrix having the triangular data pattern, for at least one tile of the output operand, the host processor is further configured to:
determine whether at least one sub-tile of the input operand intersects the main diagonal of the square matrix; and
responsive to determining that the at least one sub-tile intersects the main diagonal of the square matrix, mask out at least a portion of the elements of the at least one sub-tile on one side of the main diagonal.

5. The system of claim 1, wherein the square matrix is a triangular matrix.

6. The system of claim 1, wherein the square matrix is a symmetric matrix.

7. The system of claim 6, wherein the matrix multiplication operation comprises multiplying a rectangular matrix of dimension N×K with a transpose of the rectangular matrix.

8. The system of claim 1, wherein the square matrix is a Hermitian matrix.

9. The system of claim 8, wherein the matrix multiplication operation comprises multiplying a rectangular matrix of dimension N×K with a conjugate transpose of the rectangular matrix.

10. The system of claim 1, wherein the memory stores a library that implements an application programming interface (API) that, responsive to being called by an application, implements at least a portion of the matrix multiplication operation using the parallel processing unit.

11. The system of claim 8, wherein the memory further stores a driver configured to launch a kernel on the parallel processing unit.

12. The system of claim 1, wherein elements of the output operand of the matrix multiplication operation are processed by a single kernel configured to perform the matrix multiplication operation using the at least one tensor core, and wherein none of the elements are generated by a floating-point arithmetic logic unit of the parallel processing unit.

13. A computer-implemented method for performing a matrix multiplication operation, the method comprising:
partitioning, by a host processor, an output operand of the matrix multiplication operation into a number of tiles;
responsive to determining that the output operand of the matrix multiplication operation is a square matrix having a triangular data pattern:
for at least one tile of the output operand:
determining whether the at least one tile is valid based on a location of the tile relative to a main diagonal of the square matrix, and
responsive to determining that the at least one tile is valid, launching an operation on a parallel processing unit to generate values for the elements of the at least one tile using a at least one tensor core, or
responsive to determining that the at least one tile is invalid, preventing the elements of the at least one tile from being processed by the parallel processing unit; or
responsive to determining that an input operand of the matrix multiplication operation is a square matrix having a triangular data pattern:
for at least one tile of the output operand:

partitioning a portion of the input operand into a number of sub-tiles associated with the at least one tile of the output operand, for at least one sub-tile of the input operand, determining whether the at least one sub-tile is valid based on a location of the at least one sub-tile relative to a main diagonal of the square matrix, and responsive to determining that the at least one sub-tile is valid, launching an operation on the parallel processing unit to generate values for the elements of the at least one tile using the at least one tensor core to process the elements of the at least one sub-tile, or responsive to determining that the at least one sub-tile is invalid, preventing the elements of the at least one sub-tile from being processed by the parallel processing unit.

14. The method of claim 13, wherein elements of a first tile of the number of tiles are generated by a first tensor core in parallel with elements of a second tile of the number of tiles generated by a second tensor core.

15. The method of claim 13, wherein, responsive to determining that the output operand of the matrix multiplication operation is the square matrix having the triangular data pattern, for at least one tile of the output operand, the method further comprises:

determining whether the at least one tile intersects the main diagonal of the square matrix; and responsive to determining that the at least one tile intersects the main diagonal of the square matrix, masking out at least a portion of the elements of the at least one tile on one side of the main diagonal.

16. The method of claim 13, wherein, responsive to determining that the input operand of the matrix multiplication operation is the square matrix having the triangular data pattern, for at least one tile of the output operand, the method further comprises:

determining whether at least one sub-tile of the input operand intersects the main diagonal of the square matrix; and responsive to determining that the at least one sub-tile intersects the main diagonal of the square matrix, masking out at least a portion of the elements of the at least one sub-tile on one side of the main diagonal.

17. The method of claim 13, wherein the square matrix is a triangular matrix, a symmetric matrix, or a Hermitian matrix.

18. The method of claim 13, wherein an application executed by the host processor is configured to call an application programming interface of a library configured to implement the matrix multiplication operation, and wherein a driver is configured to launch a kernel on the parallel processing unit in response to a call from one of the library or a runtime API.

19. The method of claim 13, wherein elements of the output operand of the matrix multiplication operation are processed by a single kernel configured to perform the multiplication operation using the at least one tensor core, and wherein at least one of the elements is not generated by a floating-point arithmetic logic unit of the parallel processing unit.

20. A non-transitory computer-readable media storing computer instructions for performing a matrix multiplication operation that, when executed by a host processor, cause the host processor to perform the steps of:

partitioning, by a host processor, an output operand of the matrix multiplication operation into a number of tiles;

responsive to determining that the output operand of the matrix multiplication operation is a square matrix having a triangular data pattern:

for at least one tile of the output operand:

determining whether the at least one tile is valid based on a location of the at least one tile relative to a main diagonal of the square matrix, and responsive to determining that the at least one tile is valid, launching an operation on the parallel processing unit to generate values for the elements of the at least one tile using the at least one tensor core, or responsive to determining that the at least one tile is invalid, preventing the elements of the at least one tile from being processed by the parallel processing unit; or responsive to determining that an input operand of the matrix multiplication operation is a square matrix having a triangular data pattern:

for at least one tile of the output operand:

partitioning a portion of the input operand into a number of sub-tiles associated with the at least one tile of the output operand, for at least one sub-tile of the input operand, determining whether the at least one sub-tile is valid based on a location of the at least one sub-tile relative to a main diagonal of the square matrix, and responsive to determining that the at least one sub-tile is valid, launching an operation on a parallel processing unit to generate values for the elements of the at least one tile using at least one tensor core to process the elements of the at least one sub-tile, or responsive to determining that the at least one sub-tile is invalid, preventing the elements of the at least one sub-tile from being processed by the parallel processing unit.

* * * * *